United States Patent [19]

Anderson et al.

[11] 3,781,837
[45] Dec. 25, 1973

[54] AMBIENT COMPENSATED TEMPERATURE RESPONSIVE DEVICE
[75] Inventors: Thomas W. Anderson; Robert L. Caroon, both of Albuquerque, N. Mex.
[73] Assignee: Jac, Inc., Clovis, N. Mex.
[22] Filed: July 8, 1971
[21] Appl. No.: 160,612

[52] U.S. Cl............... 340/233, 128/2 H, 128/399, 340/228
[51] Int. Cl............................................ A61b 6/10
[58] Field of Search................... 340/227, 228, 233; 128/2 H, 399

[56] References Cited
UNITED STATES PATENTS

| | | | |
|---|---|---|---|
| 3,274,994 | 9/1966 | Strum | 128/2 H |
| 3,500,367 | 3/1970 | Fremont et al. | 340/227 X |
| 3,636,540 | 1/1972 | Harris | 340/233 |
| 3,282,106 | 11/1966 | Barnes | 128/2 H |
| 3,651,694 | 3/1972 | Lamb | 128/2 H |
| 3,494,196 | 2/1970 | Moussette | 340/233 X |
| 3,570,313 | 3/1971 | Frank et al. | 340/233 X |

Primary Examiner—John W. Caldwell
Assistant Examiner—Scott P. Partridge
Attorney—Clarence A. O'Brien and Harvey B. Jacobson

[57] ABSTRACT

A temperature responsive device is provided for use with cattle, and similar livestock, to furnish signals when the measured body temperature of the animal exceeds predetermined limits which are indicative of infection or disease within the animal. A small electronic package is conveniently fastened about the animal's neck and is connected to a thermistor sensing element implanted in one of the outer ear canals of the animal. The electronic package is provided with a temperature compensated amplifier and includes means compensating for changes in body temperature due to changes in ambient temperature, such that false signals will not be generated by the device. When the amplifier output reaches a predetermined threshold level, a signal device, such as an audio alarm, is energized to indicate that the animal should receive immediate diagnosis or treatment.

10 Claims, 5 Drawing Figures

Thomas W. Anderson
Robert L. Caroon
INVENTORS.

Thomas W. Anderson
Robert L. Caroon
INVENTORS.

AMBIENT COMPENSATED TEMPERATURE RESPONSIVE DEVICE

The present invention is generally related to temperature responsive devices and, more particularly, to devices which are responsive to temperatures measured in living bodies.

For many years, the livestock industry has suffered substantial losses due to infection and disease which was undetected in time for preventive steps to be taken. Such has often resulted in the death of livestock and the loss of revenues, which was ultimately reflected by increase in consumer prices.

Many methods have been proposed to reduce such livestock losses. The use of antibiotics as additives in livestock feed has become common practice in the industry. However, the widespread use of antibiotics in the daily diets of livestock has been a subject of controversy, many experts in the field claiming that such renders the animal unfit for human consumption. Furthermore, even if such antibiotics could be conclusively shown to be safe, the expense of including such in livestock feed on a regular basis greatly diminishes the sought after advantage of cost reductions.

A vast majority of diseases and infections in large cattle herds have been those which may have been detected by a rise in body temperature. Normally, the infected animal's symptoms are not detected physically until the body temperature has risen to a point which causes incapacitation. Unfortunately, when the infection or disease has progressed to this point, massive dosages of wide spectrum antibiotics must be administered to save the animal's life, such administration, often, being either unsuccessful or rendering the animal unfit for human consumption. Therefore, it is desirable to provide a means of substantially reducing livestock losses due to infection and disease by early detection, such that it may be dealt with more effectively and efficiently and without the need of massive dosages of antibiotics.

It has been determined that if abnormal increases in body temperature (of for example, 2° F.) can be detected as soon as they occur, such would permit extremely early detection of the disease and rapid treatment thereof before the disease becomes incapacitating. It is, therefore, most desirable to provide a device capable of detecting changes in body temperature of an animal due to infection or disease, regardless of the ambient temperature surrounding the animal.

It is an object of the present invention to provide a versatile electrical device which may be conveniently fastened to a portion of an animal for detecting changes in body temperature and providing an appropriate output signal when the body temperature exceeds predetermined limits which are indicative of infection or disease in the animal.

Another object of the present invention is to provide a unique self-contained electronic device which may be fastened to the neck and head regions of an animal with a thermistor sensing element inserted into the outer ear canal of one of the animal's ears to sense changes in body temperature.

It is a further object of the present invention to provide a versatile electronic device which provides an output signal responsive to body temperature and including means which compensates for changes in body temperature due solely to changes in ambient temperature, such that false output signals are eliminated.

Still another object of the present invention is to provide a temperature responsive device which is compact, self-contained, and able to withstand environmental temperature changes within a range of −25° F. to +125° F., yet provide accurate output signals with respect to the animal's body temperature.

It is still a further object of the present invention to provide an electronic device for monitoring the body temperature of cattle and similar livestock in a typical feed lot operation to provide early detection and treatment of infection or disease which may be encountered, such that the loss of livestock may be significantly reduced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
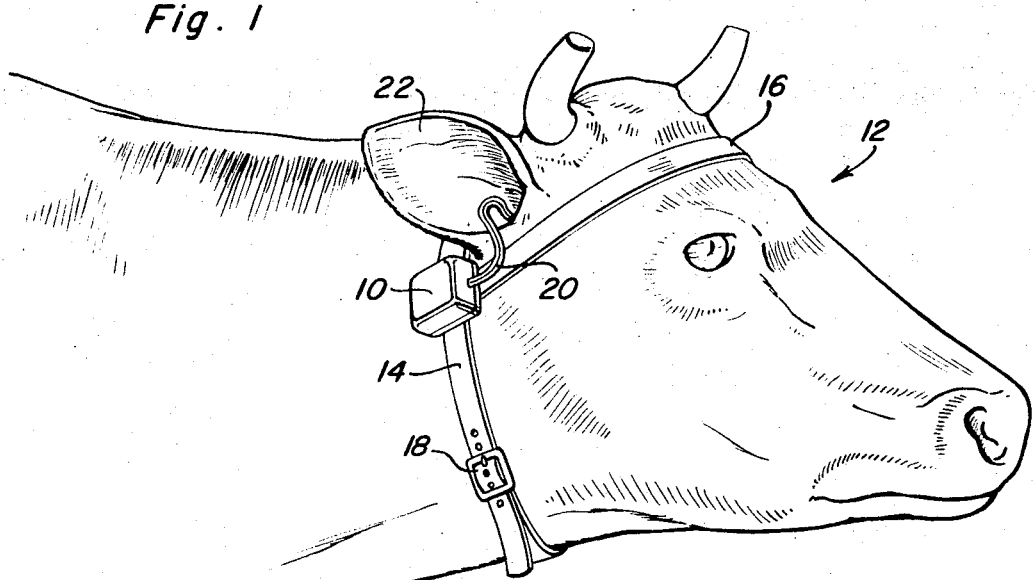
FIG. 1 is a perspective view of the temperature responsive device of the present invention fastened to the neck and head regions of an animal whose body temperature is to be sensed.
Figure 2:
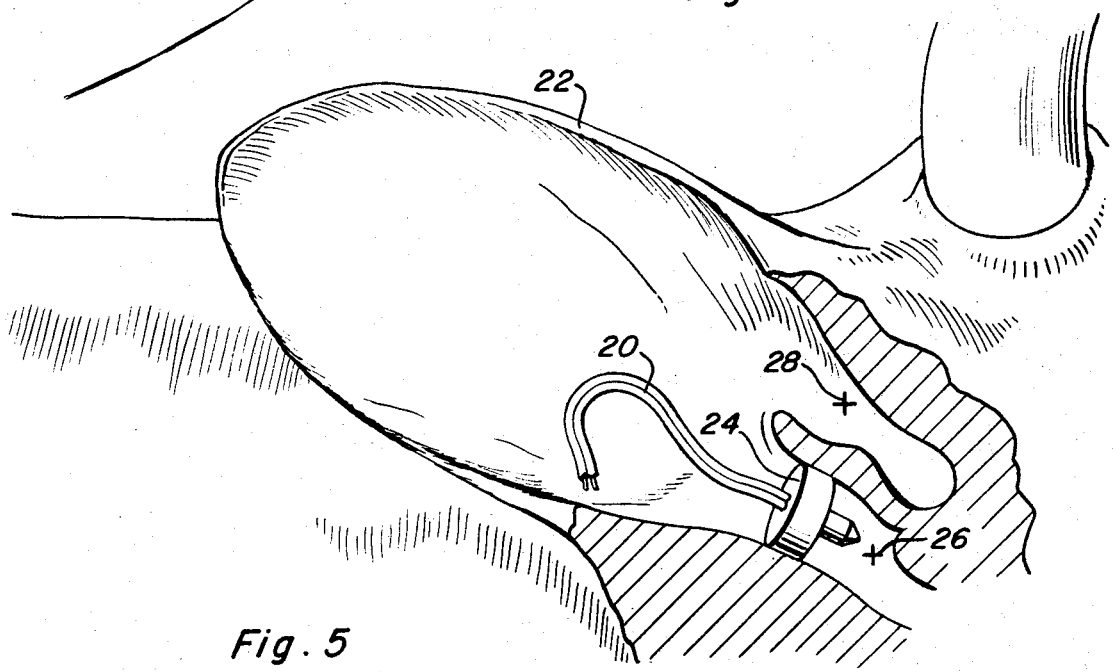
FIG. 2 is an enlarged perspective view of the thermistor temperature sensing element associated with the present invention and located in the ear canal of an animal whose temperature is to be sensed.

Referring now more particularly, to FIGS. 1 and 2, the electronic package associated with the present invention is indicated by the numeral 10 and is illustrated as being fastened to an animal, generally indicated by the numeral 12, by way of a neck band 14 and a head band 16 engaging corresponding body regions of the animal. Neck band 14, preferably, is provided with a conventional buckle-type fastener 18 which may be adjusted to insure proper fit to the animal during its growth period. Of course, if desired, other suitable fastening means might be utilized to hold the electronic package in proper position.

A pair of electrical leads 20 extend from electronic package 10 and enter an ear 22 of the animal and are connected to a temperature sensing device, such as a thermistor indicated by the numeral 24 and illustrated in FIG. 2. Preferably, thermistor 24 is located inside of the outer ear canal in order to insure proper insulation from the surrounding ambient air, such that the temperature sensed will not be significantly influenced thereby. Alternate locations of the thermistor are indicated by the numerals 26 and 28. These locations also have been found to provide proper insulation and at the same time provide temperatures to the thermistor which are indicative of the animal's true body temperature. Of course, other thermistor locations might also be used and the manner of mounting the thermistor may be varied accordingly, such mounting not constituting a part of the present invention.

Figure 5:
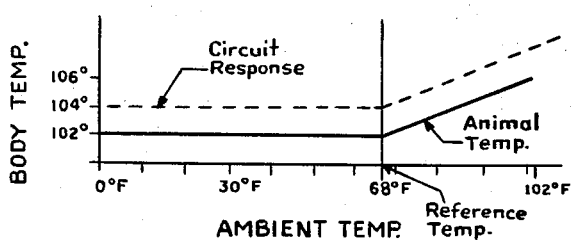
FIG. 5 is a graph of a typical curve illustrating changes in body temperature due to changes in ambient temperature.

It will be appreciated that the purpose of the present invention is to provide signals indicating when an animal's body temperature has increased due to infection, disease or the like. This permits early detection and an opportunity to administer prompt treatment before the animal becomes incapacitated. It has been found that an animal's body temperature changes slightly due to changes in ambient temperature. For example, of the cattle tested, the body temperatures of healthy specimens were normally 102° F. when the surrounding or ambient temperature did not exceed 68° F. However, for ambient temperatures above 68° F. the healthy body temperatures increased to a maximum of 106° F. when the ambient temperature was 104° F. These variations of body temperature in a healthy animal due to changes in ambient temperature may be plotted and described in the form of a mathematical curve of animal body temperature versus ambient temperature shown in FIG. 5. Without providing means for compensating the ambient temperature, signals obtained from the thermistor would produce erroneous output signals from the electronic package which on an abnormally hot day could indicate a healthy animal as one suffering from infection or disease. Similarly, an animal which is in fact infected or diseased could exhibit normal or below normal body temperatures when exposed to extremely cold surroundings. Therefore, a temperature compensation curve corresponding to the curve of animal temperature versus ambient temperature, is incorporated into a temperature compensation circuit in the electronic package. The electronic circuitry, thus, provides correction of the thermistor signals to avoid erroneous outputs.

Figure 3:
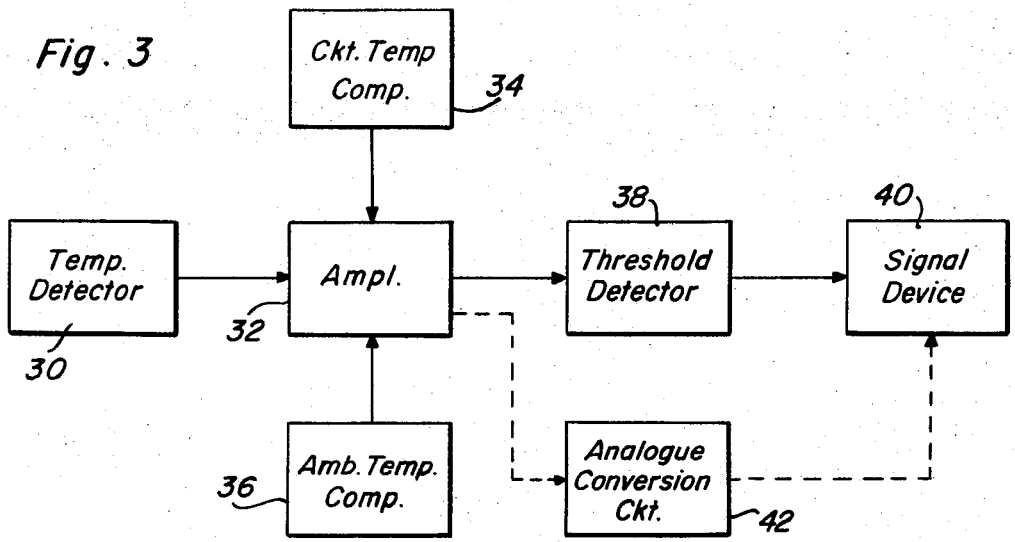
FIG. 3 is a simplified diagrammatic representation of the electronic circuit associated with the present invention.

This together with other versatile features of the circuitry of the present invention are illustrated in FIG. 3. Block 30 of the diagram represents a temperature detector, preferably of the thermistor type explained above which provides a variable resistance which is inversely proportional to the animal's body temperature. The temperature detector signal is fed into an amplifier which is indicated by the numeral 32. Since it is desirable for the amplifier to operate properly over a large temperature range from approximately a −25° F. to a +125° F., the amplifier is provided with temperature compensation as indicated by numeral 34. At ambient temperature compensation circuit 36 is also provided to compensate the amplifier output signals such that they will be unaffected by changes in body temperature due solely to changes in ambient temperature, as explained above. Without the use of ambient temperature compensation 36 the outputs from the amplifier would be valueless.

Block 38 represents a threshhold detector which is set at a predetermined level to yield an output signal when the output signals from amplifier 32 exceed predetermined levels. It is desirable when monitoring the body temperatures of cattle, that the threshhold detector be set such that increases of 2° F. in the animal's body temperature due to disease or infection (rather than ambient temperature) will be effective to yield the desired output signal from the threshhold detector. Block 40 represents an output device which may provide an audible indication of increased body temperature. Of course, other types of signals such as visual indications or radio frequency transmissions may be utilized when desired.

In applications where a threshold point output indication is not desired, an analogue conversion circuit, indicated by numeral 42, may be substituted to permit monitoring personnel to obtain direct temperature readings through conventional devices such as chart recorders or digital read-out equipment.

Figure 4:
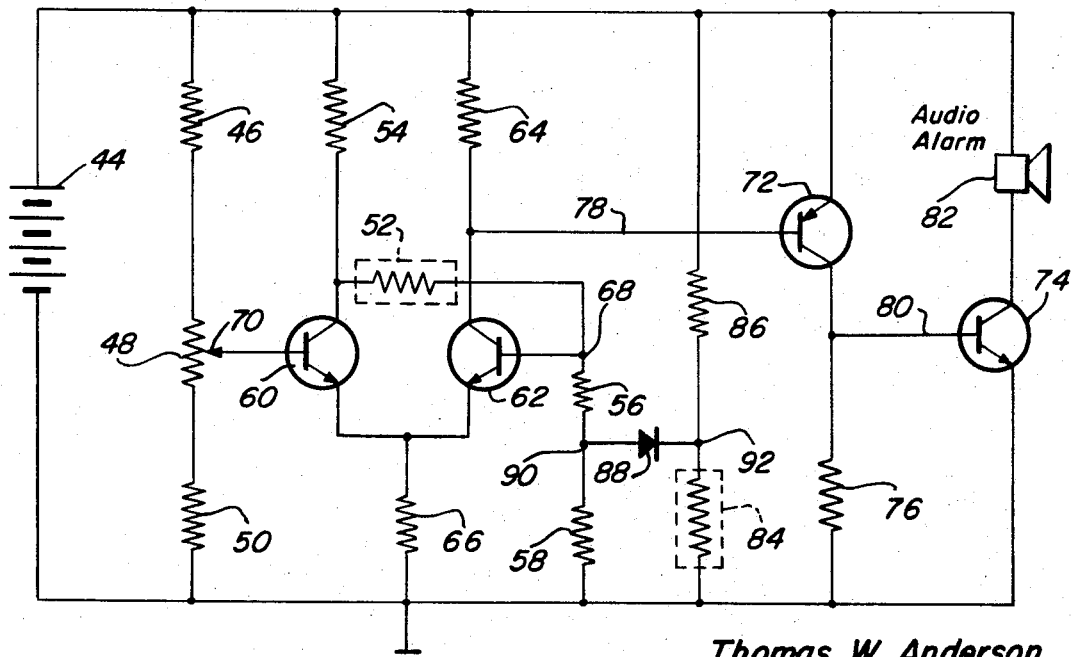
FIG. 4 is a schematic of the preferred embodiment of the electronic circuit associated with the present invention.

Referring, now, to FIG. 4 the electronic circuitry associated with the present invention can be seen in more detail. A source of voltage 44 is provided and may be comprised of a conventional battery or batteries mounted in the enclosure of electronic package 10. The voltage is impressed across a first series of resistors 46, 48 and 50 which provide a first path of current for a bridge circuit. A thermistor 52 is provided and is implanted into the ear of an animal as described above, its resistance being inversely proportional to the measured body temperature. A second path of current for the bridge circuit is provided through resistors 54, 56 and 58 through thermistor 52. Transistors 60 and 62, together with resistors 54, 64 and 66 provide a differential amplifier across the nodes 68 and 70 of the bridge. Resistor 48 is of the variable type and may be adjusted to provide balance of the bridge circuit, this balance being set for conditions representing healthy animal body temperatures. Any increase in body temperature will reduce the resistance of thermistor 52 to provide an imbalance in the bridge circuit.

The threshhold detector portion of the circuit is provided by transistors 72 and 74 together with resistor 76. The base of transistor 72 is connected between resistor 64 and the collector of transistor 62 through lead 78. Transistor 74 is connected in a grounded-emitter configuration with its base connected to the collector of transistor 72 by way of lead 80. An audio alarm 82 is connected between voltage source 44 and the collector of transistor 74 to produce an indicating signal when the body temperature of the animal has increased beyond the desired levels due to causes other than changes in ambient temperature.

A second thermistor 84 is connected in series with resistor 86, both of which are in parallel with voltage source 44. A diode 88 is connected at one end to a point 90 between resistors 56 and 58. The opposite end of the diode is connected at a junction point 92 intermediate thermistor 84 and resistor 86. The ambient temperature compensating circuit 36 is provided by thermistor 84, together with resistors 86, 56 and 58 and diode 88. Thermistor 84 is located in electronic package 10 in such a position that it will be significantly influenced by the temperature of the surrounding air. Thus, as the ambient temperature increases, the resistance of thermistor 84 is decreased. This biases diode 88 in a forward direction causing it to conduct. Similarly, as the ambient temperature is decreased, the resistance of thermistor 84 increases to bias diode 88 in the reverse direction. When diode 88 conducts, it draws current from the base of transistor 62, increasing the threshhold point at which transistor 72 is triggered.

The relative values of components 56, 58, 84 and 86 are selected to provide the desired compensation. For example, when sensing the body temperature of an animal in an ambient temperature equal to some reference temperature of, say, 68° F., it is desirable that no significant ambient temperature compensation be provided in the circuit. As ambient temperature increases, as defined by the above-mentioned mathematical curve, it is desirable that diode 88 be biased in a forward direction. This is done through thermistor 84. The slope of the ambient temperature compensation curve may be controlled by the ratio of the value of resistors 56 and 58.

The operation of the ambient temperature compensating circuit may be explained as follows. Assuming that the animal is not exhibiting an abnormal temperature (temperature changes due to disease and the like), and that the ambient temperature is at the reference temperature (68° F.), the bridge circuit will be balanced, and diode will not be biased in the forward direction. As the ambient temperature increases, the resistance of body temperature thermistor 52 will decrease slightly due to slight increases in body temperature, as will the resistance of thermistor 84, such that diode 88 is biased in the forward direction. The decrease in resistance of thermistor 52 would be expected to cause an unbalanced condition in the bridge circuit. However, this imbalance is offset by introducing thermistor 84 into the bridge circuit through diode 88, the combined resistance of parallel resistors 58 and 84 being less than the value of resistor 58 alone.

When experiencing the low ambient temperature condition (below 68° F.), the resistance value of body temperature thermistor 52 will be increased slightly. While an unbalanced condition exists in the bridge circuit, the base of transistor 62 is more negative than previously, such that transistor 62 does not conduct. Should the animal, in fact, be experiencing abnormal body temperatures due to infection or disease a corresponding reduction in the resistance of thermistor 52 will bias the base of transistor 62 positive, causing it to conduct. This, in turn, provides a negative bias to the base of transistor 72 which is of the p-n-p type, and which, together with resistor 76, functions as a voltage amplifier. Ultimately, transistor 74 is caused to conduct, thus energizing audio alarm 82 to indicate an abnormal body temperature in the animal.

Several versatile features of the circuitry of the present invention should be noted. Balance of the bridge circuit may be adjusted by variable resistor 48. This assures the balanced condition at a desired reference temperature at which the animal's body temperature is not significantly influenced by the ambient temperature. Secondly, the ratio of resistors 56 and 58 may be selected to correspond to the slope of the ambient temperature compensation curve.

It will also be appreciated that all resistors in the bridge circuit are selected to have a low temperature coefficient. This assures that the bridge will be unaffected by changes in ambient temperature over a range of −25° F. to +125° F. This is indicated by block 34 in FIG. 3. Minor resistance changes which do occur, occur in all the bridge resistors and the bridge remains substantially balanced. It should also be noted that the use of the bridge circuit eliminates the need for a regulated voltage power supply, changes in battery voltage not affecting the bridge balance. It has been found that the circuit functions properly with power supply voltage fluctuations as low as fifty percent of the design voltage.

It will also be appreciated that since the body temperature thermistor 52 is connected to the base of transistor 62, changes in body temperature will be amplified by transistor 62. The common emitter resistor 66 causes a signal to be impressed upon the emitter of transistor 60, such that it acts as a grounded base amplifier. This action causes regeneration which increased the overall sensitivity for small temperature changes.

It should be noted, that although the present invention is intended for use with cattle and similar livestock, it may, likewise, be used for detecting the body temperatures of other animals. Also, while an audio alarm is disclosed in the preferred embodiment, other signal devices may be used equally as well.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for indicating abnormal health conditions in a living body as a function of body temperature where the temperature of the living body in a healthy condition is a known function of ambient temperature over a temperature range to which the living body is exposed, said device comprising first circuit means for producing output signals representative of said abnormal health conditions, second circuit means including first and second temperature sensing means for comparing the temperature of the living body with the temperature of the ambient surrounding the living body to enable said first circuit means to produce said output signals when said sensed body temperature differs from said known function by predetermined temperature values, said first temperature sensing means being in close heat transfer relationship to the living body for sensing the temperature thereof, said second temperature sensing means sensing the ambient temperatures surrounding the living body.

2. The device set forth in claim 1 wherein said first temperature sensing means includes a first temperature sensitive thermistor fitted closely to the living body.

3. The device set forth in claim 2 wherein said second temperature sensing means includes a second temperature sensitive thermistor exposed to the ambient temperature.

4. The device set forth in claim 1 wherein said first and second temperature sensing means include first and second temperature variable resistance means fitted closely to the living body and exposed to the ambient respectively, the value of said resistance means varying substantially with changes in temperature.

5. The device set forth in claim 4 wherein said second circuit means comprises a bridge circuit connected across a source of voltage, said first and second temperature variable resistance means being in different legs of said bridge circuit, said first circuit means including first amplifier means connected across the nodes of said bridge circuit for producing said output signals when the bridge is in an unbalanced condition.

6. The device set forth in claim 5 wherein said first and second temperature variable resistance means include first and second temperature sensitive thermistors.

7. The device set forth in claim 5 wherein said second circuit means includes means for inserting said second temperature variable resistance means into said second leg of said bridge circuit only when said ambient temperature is greater than a predetermined reference temperature.

8. The device set forth in claim 7 wherein said amplifier means connected to said bridge circuit provides said output signals in response to imbalance of the bridge circuit.

9. The device set forth in claim 8 wherein said amplifier means includes a differential amplifier connected across the nodes of said bridge circuit.

10. The device set forth in claim 7 wherein said means for inserting said second variable resistance means includes diode means which is reverse biased unless said ambient temperature is greater than said predetermined reference temperature.

* * * * *